3,728,327
PROTEIN AND METHOD OF EXTRACTING SAME FROM SOYBEANS EMPLOYING REVERSE OSMOSIS
Dean Russell Frazeur and Robert Bruce Huston, Muscatine, Iowa, assignors to Grain Processing Corporation, Muscatine, Iowa
No Drawing. Continuation-in-part of application Ser. No. 43,981, June 5, 1970. This application Apr. 10, 1972, Ser. No. 242,677
Int. Cl. A23j 1/14
U.S. Cl. 260—123.5                                    2 Claims

ABSTRACT OF THE DISCLOSURE

An aqueous homogenized slurry of soybean particles is subjected to a separation so as to separate insoluble materials from liquid and the liquid is subjected to reverse osmosis to obtain as a retentate soy proteins including both those which are insoluble and soluble in water at the protein isoelectric point.

---

This application is a continuation-in-part of application Ser. No. 43,981, filed June 5, 1970, now abandoned.

This invention relates to the separation of a novel protein product from soybeans.

Soybeans afford a rich source of protein and the separation or extraction of such from soybeans is of great importance to the art. Accordingly, specific objects of the present invention are: (a) to provide a novel and economical method for extraction of protein from soybeans, and (b) to provide a novel protein product obtained from soybeans.

It is known that protein can be obtained from soybeans by soaking soybeans in water for prolonged periods; grinding the soaked beans into a slurry; centrifuging the slurry to separate insoluble materials and precipitating protein from the extracted liquid. Precipitation of the protein from the liquid is accomplished by adjusting the pH thereof to approximately a pH of 4.5, which is the isoelectric point at which a large part but not all of the protein in the liquid becomes insoluble and precipitates from solution. A minor but significant amount of soy protein remains soluble at the isoelectric point and is usually discarded as a waste product. The soy protein precipitates produced in this way possess less than maximum characteristics with respect to flavor, nutritional value and ability to absorb or bind water which is a desideratum when the soy protein is to be used, for example, in baked goods or meat products.

In accordance with this invention there are obtained from soybeans protein products which contain not only protein which is insoluble at the soy protein isoelectric point (approximately pH 4.5) but also protein which is soluble at the isoelectric point (whey proteins).

In the practice of this invention defatted soybeans, preferably in particulate form such as ground, flaked or shredded, are slurried in water. Preferably 80 to 99 or more parts of water per part of the particulate soybean material is employed to form the slurry, vigorous mixing being employed to insure good dispersion. The temperature of the water is not critical and can be at ambient or higher temperatures. The pH of the slurry is preferably that of the soy flakes but may be adjusted as needed for specific uses.

The well mixed slurry is then passed through a homogenizer or other type of comminuting apparatus to obtain a relatively fine dispersion of the soybean material in water. Any conventional homogenizer can be used for this homogenizing step such as homogenizers used in the dairy industry for homogenizing milk. Homogenizing pressures of from 1,500 to 10,000 p.si.g. and comminuter settings of about 0.01 inch or less between rotor and stator are satisfactory. Substantially instantaneous protein release is accomplished by carrying out the homogenization or comminuting step so as to insure that a majority of the soybean particles have a size of not more than about 25,000 microns in diameter. This desired particle size can be readily obtained as is known in the art by appropriate adjustment or setting of the homogenizer or comminuting apparatus.

The fine dispersion from the homogenizing step is subjected to a separation operation so as to separate soluble proteins and carbohydrates from insoluble materials. Centrifugal separation can be advantageously employed in this step. The sediment which is separated can be discarded or, if desired, can be again dispersed in from about 1 to 10 volumes of water and again subjected to centrifugation or the like so as to maximize recovery of soluble protein material which may be entrapped within or accompany the sediment. The sediment from this separation step(s) may contain a small amount of protein and thus, from an economy standpoint, can be used in animal feeds or the like.

Liquid from the preceding separation step is then subjected to the process variously known as reverse osmosis, ultrafiltration or membrane separation process. The known principle of this procedure is to apply pressure to transfer water, or water and relatively small molecules of solute through a semi-permeable membrane. This causes the transfer of water and selected materials from a more concentrated to a more dilute solution. Various types of membranes are available which will permit certain solute materials along with the solvent to pass through the membrane into the diffusate while other solute materials are retained thereby in the retentate. For use in accordance with this invention a membrane is chosen which is capable of allowing naturally occurring salts, carbohydrates and nitrogenous materials of relatively small molecular size to rapidly pass into the diffusate. At the same time the membrane must be closed enough to retain the proteins of larger molecular size which are desired in the final product.

Suitable reverse osmosis equipment is commercially available from such manufacturers as Dorr-Oliver Corporation and Havens OSMOTIK [1] Corporation. The choice of membrane is routine, being governed by the above considerations. Suitable representative membranes are Dorr-Oliver Corporation XPA and APA membranes and the Havens 215 membrane.

In the practice of this invention the soy homogenate can, if desired, be washed or concentrated or both washed and concentrated during reverse osmosis. Washing is the admission of water to the system during reverse osmosis at a rate equal to the rate of removal of diffusate, thus maintaining a constant retentate volume. This causes materials of relatively small molecular size to pass into the diffusate and purifies the proteins in the retentate. Concentration is achieved during the reverse osmosis procedure by simply permitting the retentate volume to decrease as diffusable materials and water pass from the retentate to the diffusate without the admission of water. Washing the retained proteins with about 0.5–4.0 volumes of water is generally sufficient to obtain a high quality soy protein isolate upon subsequent drying. Concentration provides both purification and economies in processing. Concentration of up to 3 fold or more may be practical.

The retentate from the reverse osmosis step is removed from the reverse osmosis equipment and dried to provide a novel, high quality soy protein isolate.

---
[1] Trademark.

The retentate, which is retained by the membrane in the reverse osmosis procedure, possesses a number of very important characteristics. The retentate generally contains about 9–14% more of the total soybean protein content than is the case of soy protein isolates obtained by convenional protein precipitation procedures. Not only is this increased protein recovery important from an economic standpoint but, in addition, the product possesses improved nutritional advantages because the recovered protein contains high levels of sulfur-bearing amino acids. The process of this invention provides definite economic advantages with respect to costs of equipment, equipment operation and in the overall cost of producing the soy protein isolate.

The following examples are illustrative of the present invention.

EXAMPLE I

A 5% weight/volume slurry of "white" soybean flakes is made with cold tap water. After complete mixing of the soy flakes and water, the resulting slurry is continuously introduced into a tri-plex pump homogenizer and homogenized at 3,000 p.s.i.g. The homogenized soy slurry is then separated into supernatant liquid and sediment by passing the slurry through one or more conventional centrifuges. The sediment is discarded and the supernatant liquid is concentrated 4 fold by reverse osmosis through a Dorr-Oliver XPA membrane in Dorr-Oliver reverse osmosis support modules. The retentate is then washed with 2–3 volumes of water during reverse osmosis.

The retentate is then removed from the reverse osmosis equipment and dried in a conventional spray drier to give a soy protein isolate characterized by:

High nutritive value
High protein solubility (>75% NSI)
Excellent flavor
Light color (white or light tan)
Superior water binding properties (viscosity of 2% solutien 12 cps. at 30° C.)
Essentially (>75%) all protein in a natural (non-denatured) form
Improved stability to heat (<20% denatured at 99° C. for 5 minutes)
Improved fat emulsifying properties (>200 ml. soy oil emulsified/g. of isolate)
Controllable heat gelation characteristics.

A distinguishing feature of this soy protein isolate which is of considerable importance is its gelling characteristics. Soy protein isolates, made by known prior art precipitation procedures, generally form gels in 7% aqueous solutions at 65° C. in a period of 10–15 minutes. However, soy protein isolates made by this invention do not gel under these conditions even if the time is greatly extended. The absorption of calcium by the soy isolate of this invention is required to permit heat gelation. Typically, approximately 0.2 milligrams of soluble calcium per gram of the soy isolates of this invention is required to permit heat gelation under the above specified conditions. Generally, addition of approximately 0.3 milligram of soluble calcium per gram of soy isolate will cause gelation of a 7% aqueous solution of the novel soy isolates at room temperature (25° C.) in 30 minutes. This property is of great value when the soy protein isolate is used in foods, such as in processed meats where both calcium binding and heat gelation is desired. Other divalent cations, such as magnesium and manganese and monovalent cations such as sodium and potassium have no or essentially no effect on heat gelation of isloates.

The isolates of the invention are further characterized by an amino acid profile which is particularly desirable from a nutritional standpoint. The following table gives a typical comparison of the amino acid profile of soy protein isolates produced in accordance with this invention as compared with soy protein isolates obtained by prior art precipitation procedures.

TABLE I.—TYPICAL AMINO ACID COMPOSITION OF SOY ISOLATES

| Amino acid | Grams amino acid/16 grams nitrogen | |
| --- | --- | --- |
| | Soy isolates of invention | Soy isolates of prior art |
| Alanine | 3.9 | 3.9 |
| Arginine | 6.4 | 7.8 |
| Aspartic acid | 11.2 | 11.9 |
| Cystine | 1.3 | 1.3 |
| Glutamic acid | 18.4 | 20.5 |
| Glycine | 4.5 | 4.0 |
| Histidine | 2.5 | 2.5 |
| Isoleucine | 5.2 | 4.9 |
| Leucine | 8.0 | 7.7 |
| Lysine | 6.2 | 6.0 |
| Methionine | 1.4 | 1.1 |
| Phenylalanine | 5.5 | 5.4 |
| Proline | 5.2 | 5.3 |
| Serine | 5.8 | 5.5 |
| Threonine | 3.8 | 3.7 |
| Tryptophan | 1.3 | 1.3 |
| Tyrosine | 4.3 | 1.7 |
| Valine | 5.5 | 4.8 |

EXAMPLE II

A 3% weight/volume slurry of unheated, defatted soybean flakes is formed by thoroughly mixing the soy flakes with water at a temperature of 150° F. The slurry is continuously fed through a comminuter with the rotor and stator set at a clearance of 0.01 inch. The resulting slurry is then introduced into a series of liquid cyclones to separate soluble and insoluble materials. The liquid containing soy proteins is then subjected to a 4 fold concentration and washing with 4 volumes of water during reverse osmosis. The retentate is removed from the reverse osmosis equipment and dried. The soy protein isolate obtained possessed characteristics similar to the soy isolate produced in Example I.

EXAMPLE III

Further demonstration of the improved protein recoveries by the application of reverse osmosis was provided by two separate experiments. In both experiments a slurry of raw, defatted, dehulled soybean flakes in water was homogenized at 2,500 p.s.i.g. and 500 p.s.i.g. on the first and second stage of a Manton-Gaulin homogenizer. This slurry was thoroughly stirred, sampled and carefully analyzed for protein and total solids content. The slurry was then centrifuged at 1000 g. for 10 minutes to remove the insoluble from the soluble portions of the soybean slurry. Both portions were weighed and analyzed for protein and total solids content.

The solubles of the soybean were contained in the supernatant from the centrifuging. In both experiments this supernatant was then split into two approximately equal, weighed portions. One portion was subjected to reverse osmosis while the other portion was subjected to acid precipitation.

The portion subjected to acid precipitation was adjusted to pH 4.5 by the addition of aqueous hydrochloric acid. The acidified slurry was then centrifuged to obtain acid whey and protein. The protein was then adjusted to pH 6.8 for drying. Appropriate weighings and samples were taken from each process stream and processing step.

Reverse osmosis preparation of soy isolate was conducted. In the first experiment the soy supernatant from centrifugation was pasteurized at 60–65° C. for 30 minutes. The pasteurized supernatant was then subjected to reverse osmosis in a Dorr-Oliver laboratory model reverse osmosis equipment at 20–25° C. using APA and XPA membranes. The soy retentate (previously supernatant) was concentrated 4 fold and then washed with 1.4 volumes of cold tap water and finally dried. In this first of two experiments the application of reverse osmosis retained 95.3% of the soluble soy protein. Comparable figures for prior art (precipitation) preparation of soy isolate was 82.2% recovery of the supernatant protein. This represents a 13% increase in recoverable soluble soy protein.

In the second of the two experiments the application of reverse osmosis retained 94.7% of the soluble soy protein as compared to 83% of the soluble soy protein obtained by the prior art method. The increased retention amounted to approximately 12% of the soluble protein.

The protein lost by prior art precipitation methods but retained by the reverse osmosis method of this invention are the acid soluble proteins which are more nutritious than the proteins recovered by prior art methods.

EXAMPLE IV

A 10% weight/volume slurry of unheated dehulled, defatted soybean flakes in water is made by thoroughly mixing the flakes in cold tap water. The slurry is continuously passed through a homogenizer which subjects the slurry to 5,000 p.s.i.g. The homogenized slurry is then separated into supernatant liquid and sediment by passing the slurry through one or more centrifuges. The supernatant is subjected to minimal heat treatment to inactivate any antitrypsin factor which may be present. The supernatant is quickly cooled to ambient temperatures and subjected to washing by reverse osmosis using a Haven's No. 215 membrane in a Haven's tubular type reverse osmosis unit. The retentate is washed with 3 volumes of water giving a retentate which can either be dried or concentrated further by other means prior to drying. The retentate is removed from the reverse osmosis equipment and dried.

The soy isolate produced in this example possesses the characteristics as shown in Example I.

EXAMPLE V

A 5% weight/volume slurry of unheated, dehulled, defatted soy flakes was made by thoroughly mixing the flakes in 40° C. tap water. The slurry was continuously passed through a homogenizer which subjected the slurry to 3,000 p.s.i.g. The slurry contained all of the protein of the flakes. The homogenized slurry was then subjected to a centrifugal force of approximately 1000 r.c.f. for 10 minutes to separate the soluble and insoluble portion of the soybean solids. The soluble portion was found to contain 80% of the original soy protein. The soluble portion was then concentrated to approximately 8% protein concentration and washed with 1½ volumes of water during reverse osmosis through a Dorr-Oliver XPA membrane. The retentate from reverse osmosis after drying contained approximately 94% of the original soluble protein. This was contrasted with a recovery (under ideal laboratory conditions) of 80% of the orginal soluble protein using prior art acid precipitation to prepare soy isolates. The difference in protein recoveries (14%) can be only partially accounted for by the 9% of soy protein which was lost by acid precipitation of protein.

EXAMPLE VI

A typical prior art process for obtaining soy protein by acid precipitation is as follows:

Ninety-five parts of water + 5 parts defatted soybean flakes+sodium hydroxide to pH 8.0 → extraction 4 hours → centrifugation (in desludging centrifuge) { residual flake material
{ extract containing protein ↗ acidification with hydrochloric acid to pH 4.6 → precipitation soy protein → centrifuge (in desludging centrifuge) { acid whey
{ precipitated soy protein ↗ stir thoroughly with 1-5 volumes of water (washing) → centrifuge in desludging centrifuge) { wash water
{ precipitated soy protein ↗ add sodium hydroxide to pH 7.0±0.3 → spray dry → bag.

The following table sets forth a comparison of the properties of a typical soy protein product obtained by this invention with a soy protein product obtained by the prior art procedure of Example VI.

| Properties | Soy product of present invention | Soy product obtained by prior art process |
|---|---|---|
| Protein solubility | 75-100% | 20-60%. |
| Flavor | Excellent, very slight astringent. | Beany, dry, astringent. |
| Color | White to light tan | White to light tan, greenish tinges may be present. |
| Protein denaturation | 0-25% denatured | 40-80% denatured. |
| Heat stability (percent denatured at 210° F., 5 mins.). | 0-20 | 40-60. |
| Fat emulsifying power (ml. oil/g. protein). | 200-300 | 90-130. |
| Viscosity of 2% solution (cps. at 30° C.). | 12.0 | 9.5. |
| Gelation (lowest conc. gelling at 65 °C.). | Does not gel | 7%. |

The present invention affords numerous advantages among which may be specifically mentioned:

(a) a soy protein product is obtained which includes some proteins which are insoluble at pH 4.5 and other proteins which are soluble at pH 4.5;

(b) the recovery of valuable proteins from soybeans is increased;

(c) the recovered protein is not appreciably denatured;

(d) the protein product possesses exceptionally good properties with respect to flavor, water-solubility; nutritional value, fat emulsifying capacity, control of heat gelation and water-binding capacity;

(e) the protein product can be extracted from soybeans rapidly thereby increasing production rates;

(f) recovery of proteins normally lost as waste product affords economic advantages and also reduces pollution problems associated with disposal of whey;

(g) a protein product having an improved amino acid profile is obtained;

(h) an improved process in which the use of strong chemicals is eliminated.

As is apparent from the foregoing description of the invention, defatted soybeans are slurried in water using mechanical homogenization. The water employed is water substantially free of sodium chloride since saline extraction does not provide soy protein comparable in yields or in properties to soy protein produced in accordance with this invention. The difference in yields and properties of soy protein obtained by mechanical homogenization and as prepared by saline extraction is apparent from the following experimental work and data:

One part of defatted soybean flakes was stirred with ten parts of 10% saline solution, centrifuged and separated into protein and residue fractions. The samples were then freeze dried. For mechanical homogenization, one part of the same lot of soybean flakes was mixed with ten parts of water and passed through a mechanical homogenizer. The preparation was then centrifuged, separated into fractions, and similarly freeze dried. The results of the two procedures are given in Table 2.

A portion of each protein product was dialyzed, so that they would be in the same ionic environment, then the dialyzed and undialyzed fractions from both extractions were tested for their gelation and oil emulsification properties.

For the gelation test, a 7% protein solution was heated for 20 minutes at 100° C. Results are given in Table 3. Dialysis increased the strength of the gel with both fractions. More significantly, both with and without dialysis the protein prepared by mechanical homogenization formed a stronger gel than the protein extracted by saline.

It should be noted that the gelation results given (see column 3) were obtained at 65° C., while the present results were obtained at 100° C. The temperatures used were necessary to demonstrate the differences between the fractions tested. If the test of column 3 had been carried out at 100° C., both fractions would have gelled, thus masking the real differences in the two fractions. Similarly, if the present test had been carried out at 65°

C., neither fraction would have gelled, again masking the real differences between the fractions.

The results of the oil emulsification test are given in Table 4. As in the gelation test, dialysis increased the value for both fractions and, both with and without dialysis, the fraction prepared by homogenization emulsified more oil than that prepared by saline extraction.

TABLE 2.—RESULTS OF EXTRACTION OF SOYBEAN FLAKES

| | | Percent | | | | | |
|---|---|---|---|---|---|---|---|
| | | Protein yield in trial No. — | | | Protein purity in trial No. — | | |
| Extraction method | Fraction | 1 | 2 | 3 | 1 | 2 | 3 |
| Saline | Product | 55 | 60 | 61 | 24 | 25 | 26 |
| | Residue | 45 | 40 | 39 | 33 | 30 | 31 |
| Homogenization | Product | 74 | 75 | 72 | 65 | 63 | 65 |
| | Residue | 26 | 25 | 28 | 37 | 36 | 40 |

TABLE 3.—RESULTS OF GELATION TEST

| Extraction | Treatment | Results |
|---|---|---|
| Saline | None | No gel (flows on inversion.). |
| Homogenization | do | Medium gel (slowly loses form on inversion.). |
| Saline | Dialyzed | Weak gel (flows on inversion.). |
| Homogenization | do | Strong gel (no change in form on inversion.). |

TABLE 4.—RESULTS OF OIL EMULSIFICATION TEST

| Extraction | Treatment | Ml. oil emulsified/gram protein |
|---|---|---|
| Saline | None | 244 |
| Homogenization | do | 305 |
| Saline | Dialyzed | 303 |
| Homogenization | do | 361 |

Those modifications and equivalents which fall within the spirit of the invention are to be considered a part thereof.

What is claimed is:

1. A process for extracting protein from soybeans which comprises forming by mechanical homogenization in water substantially free of sodium chloride a relatively homogeneous dispersion of defatted soybean particles, the majority of which have a size of not more than about 25,000 microns in diameter, then separating insoluble materials from liquid and subjecting the separated liquid to reverse osmosis to obtain as a retentate a soy protein product.

2. A soy protein product obtained by the process of claim 1.

References Cited

FOREIGN PATENTS 361,346   11/1931   Great Britain _____ 260—122

OTHER REFERENCES

Industrial and Engineering Chemistry, vol. 30, 1938, pp. 1414–1418, Smith et al.

Chemical and Engineering Progress, vol. 64, 1968, pp. 31–43, Michaels.

HOWARD E. SCHAIN, Primary Examiner

U.S. Cl. X.R.

99—2 R, 17